Patented Aug. 11, 1936

2,050,398

UNITED STATES PATENT OFFICE 2,050,398

PROCESS FOR PURIFICATION OF POTABLE AND POLLUTED WATERS

Oliver M. Urbain and William R. Stemen, Columbus, Ohio, assignors to Charles H. Lewis, Harpster, Ohio No Drawing. Application May 10, 1935, Serial No. 20,887

6 Claims. (Cl. 210—9)

The process of the present invention relates to the purification of both potable and polluted waters. By potable waters is meant water which is being purified for domestic consumption by the inhabitants of a community.

In the purification of potable water three factors are of prime importance, namely, first, sanitary quality, i. e., content of bacteria, second, tastes and odors, and third, hardness.

The tastes and odors in potable waters are due to the presence in the water of organic compounds which have their origin in decomposing organic matter or the passage of industrial wastes into the original watershed. Bacteria, algae, amoeba and many other forms of animal and vegetable life are responsible for the tastes and odors due to the decomposition of organic matter which we find in our potable water supplies. Many public water supplies are also contaminated with phenols. Such is the case in many cities located on the Ohio River and the Great Lakes. Even a few hundredths of 1.0 p. p. m. of phenols will result in a bad taste and odor in the finished water which has been chlorinated. These tastes and odors are due in large part to chlorophenols and chlorocresols.

For the purpose of removing tastes and odors in potable water supplies, activated carbons are now employed. The powdered carbon is added to the water before coagulation and, after its action is complete, is coagulated from the water with aluminum sulfate and like coagulants. The activated carbons used for this purpose are quite expensive and constitute an important item in the final costs of purification.

The present invention contemplates the use of a material which is not only much less expensive but which also will remove considerably more of the taste and odor producing compounds per unit of weight, and accomplish this result in less time than the activated carbons now employed for the purpose. It is more efficient for the purpose from any angle which may be considered.

In the purification of polluted water as distinguished from potable water, the requirements are quite different. In this case, the problem involved is one applied to the removal of organic compounds which are in true solution, and which are responsible for the B. O. D. (biochemical oxygen demand), of a polluted water after the suspended matter and the colloidal matter has been removed. This B. O. D. varies greatly for the different wastes. The B. O. D's of a few representative polluted liquids, after the removal of the suspended and colloidal matter, are given as follows:—

| Waste | 10 day B. O. D. 20° C. |
|---|---|
| | p. p. m. |
| Dilute sewage | 32 |
| Strawboard waste | 370 |
| Tannery waste | 340 |
| Creamery waste | 220 |
| Concentrated sewage | 110 |
| Packing house waste | 2200 |

The elimination of the B. O. D. of the true solution fraction of the various wastes is a problem of considerable magnitude. It is to the solution of this problem in the field of polluted liquids and to the problem of eliminating the tastes and odors from potable water supplies that the present invention is directed.

The material employed in the process consists of hydrazinated chlorinated coal. The constituents that actually do the work are the hydrazinated chlorine derivatives of coal and their derivatives. Therefore, the words "hydrazinated chlorinated coal" as used in this specification and the appended claims are inclusive of the "hydrazinated chlorine derivatives of coal and their derivatives."

The hydrazinated chlorinated coal is effective in the removal of all classes of organic compounds from water solution but is especially adapted to the removal of all organic acids and all compounds containing the active carbonyl group.

In the preparation of the base material we employ powdered coal such as sub-bituminous, bituminous or anthracite coal, powdered to pass through a 5 mesh to 20 mesh screen. The coal is chlorinated at a temperature varying from room temperature to 125° C. by passing chlorine gas through the mass. Above 125° C. the chlorine compounds decompose, so care should be taken to keep the temperature below this critical point. In this chlorination process, catalysts such as iron, iodine, sulfur or lead may to advantage be employed, though their use is not essential. The temperature of the coal mass rises somewhat during chlorination. Hydrochloric acid gas and water vapor are copiously given off. Smaller quantities of carbon oxides, hydrocarbons and chlorinated hydrocarbons are given off.

The product of such chlorination contains substantial amounts of chlorine by weight. The percentage of chlorine depends upon the following factors:—
1—Fineness of the coal.
2—Nature of the coal.
3—Temperature of chlorination.
4—Pressure.
5—Time of chlorination.

The finer the coal, the higher the temperature up to 125° C., the higher the pressure, and the longer the time of contact to complete chlorination, the higher will be the percentage of chlorine in the finished product. The chlorinated coal is more porous than the original coal, therefore it has a greater surface exposure. The fragility of the chlorinated coal is not appreciably different from that of the original coal when hard coals are employed. When soft coals are employed, the chlorinated product is much harder than the original coal. The chlorination should be carried out in an apparatus made of materials capable of withstanding the action of hydrochloric acid.

The action of the chlorine on the coal may be expressed by the following factors:
1—Chlorinated substitutes for hydrogen in the hydrocarbon part of the so-called coal conglomerate.
2—Chlorine oxidizes certain groupings and opens up the ring structures.
3—Chlorine adds to the unsaturated points in the coal.
4—Chlorine adds to the unsaturated points made under #2.
5—Chlorine renders soluble the inactive inorganic constituents (coal ash) of the coal, such as iron and its compounds, sulfur and the alkaline earth metal compounds, which, upon removal by washing, open up the coal structure, increasing the active surface of the mass.
6—Chlorine activates the surface of the mass by shifting the adsorbed and absorbed gases.

By hydrazinating the chlorinated coal we have been able to materially increase its activity and effectiveness especially toward the organic acids and compounds containing the active carbonyl group.

The method of effecting hydrazination of the chlorinated coal will now be described.

The hydrazinated chlorinated coal is prepared by heating the chlorinated coal with any of the following:—
1—Hydrazine.
2—Hydrazine hydrate.
3—Salt of hydrazine.
4—Monoacyl derivative of hydrazine.

The reaction is carried out by agitating the chlorinated coal in a solution of any of the above reagents. The solution may be in water, methanol or paraffin oil. The solution should contain, not in excess of 10%, of an inorganic base, such as NaOH or KOH. Catalysts, such as metallic copper, cadmium and antimony accelerates the reaction. As with the other cases, the reaction may be effected at atmospheric pressure with a return condenser system or in a closed system at super-atmospheric pressure. The former method is more economical while the latter is more rapid.

By the above methods the hydrazine molecule

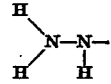

is substituted for part of the chlorine in the chlorinated coal. The general reaction is expressed as follows:
Where $\diagdown$C—Cl=chlorine bound to carbon in the chlorinated coal

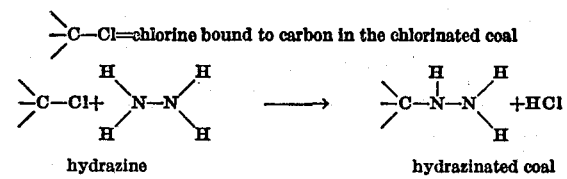

hydrazine            hydrazinated coal

The hydrochloric acid, formed by the reaction, is neutralized by the inorganic base present.

An example, showing the use of an acyl derivative of hydrazine, is given below:

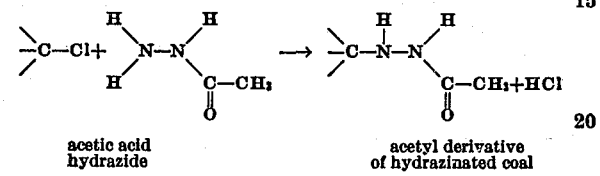

acetic acid            acetyl derivative
hydrazide            of hydrazinated coal In this case it is necessary to treat the acetyl derivative of hydrazinated coal with hot caustic, such as NaOH, to yield the hydrazinated coal. The reaction of the latter step is as follows:—

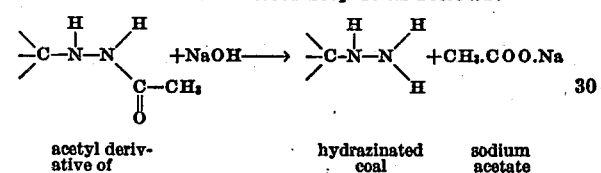

acetyl derivative of hydrazinated coal      hydrazinated coal      sodium acetate The hydrazinated chlorinated coal is then water washed and is ready for use.

Hydrazinated chlorinated coal is superior to untreated coal in the removal of all classes of organic compounds. It may be applied to the removal of organic compounds from water solution in either of two ways:
1—By the addition of the pulverized material to the water to be treated, followed by agitation and coagulation.
2—By passing the water to be treated through a filter charged with the hydrazinated chlorinated coal.

The latter of the two methods is preferred for, by this method, the material may be regenerated and reused repeatedly. By the first method the material is lost after the first using.

The organic compounds in general are removed from solution by hydrazinated coal through sorption.

The organic acids, and the compounds containing the active carbonyl group, are removed by reaction.

The general reaction for the removal of compounds containing the active carbonyl groups, is as follows:—

R and R'=hydrogen or hydrocarbon radicals, or substituted hydrocarbon radicals.

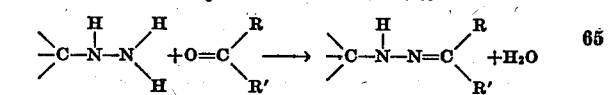

A specific example of the reaction is as follows:

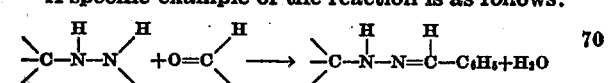

hydrazinated coal    benzaldehyde

The organic acids are removed according to the following general reaction:

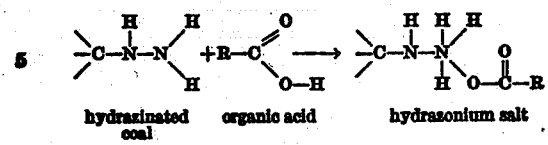

hydrazinated   organic acid   hydrazonium salt
coal

R=hydrogen, or any hydrocarbon radical, or a substituted hydrocarbon radical.

A specific example showing the removal of an organic acid, is as follows:—

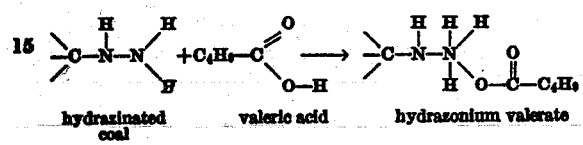

hydrazinated   valeric acid   hydrazonium valerate
coal

The material following exhaustion may be regenerated by washing with a hot solution of an inorganic acid (2% to 12%), such as $H_2SO_4$, or HCl, followed by washing with a solution of an inorganic base (2% to 15%), such as NaOH or KOH.

The general reactions for the regeneration (two steps), are as follows:—

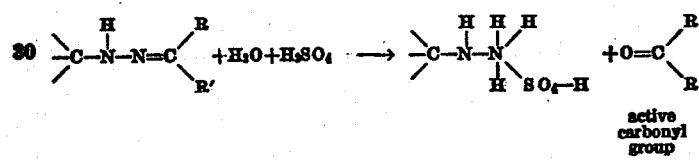

active
carbonyl
group and

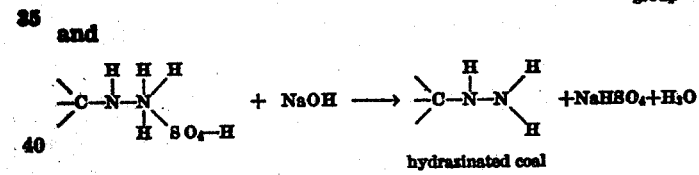

hydrazinated coal

In these examples we have employed sulfuric acid and sodium hydroxide.

The inorganic base wash also regenerates that portion of the hydrazinated coal which may have reacted with organic acids. The reaction is shown as follows:—

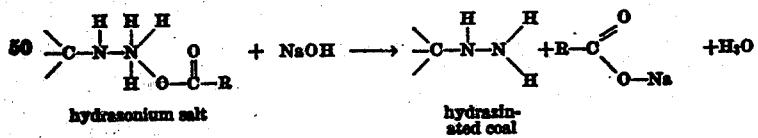

hydrazonium salt   hydrazinated coal

The washings from the regenerations contain, in rather concentrated solutions, the active carbonyl group compounds and the organic acids in the form of salts. These compounds may be recovered from the washings.

When used in the powdered form, the hydrazinated chlorinated coal is added just ahead of the coagulation step and given approximately 15 minutes of agitation. When used in potable water purification, the etherated chlorinated coal is added before or during the coagulation step and agitated for about fifteen (15) minutes.

We have effectively removed tastes and odors from potable water and also substantially eliminated the B. O. D. of the true solution fraction of organic matter present in a polluted water by treatment with hydrazinated chlorinated coal in accordance with the described process.

Having thus described our invention, what we claim is:—

1. In a process for the treatment of potable and polluted waters, the step of subjecting the water to the action of hydrazinated chlorinated coal.

2. In a process for the treatment of potable and polluted waters, the step of subjecting the water to the action of hydrazinated chlorinated derivatives of coal.

3. A process for the purification of potable waters to remove objectionable tastes and odors comprising treating the potable water with hydrazinated chlorine derivatives of coal.

4. A process for removing organic acids and all compounds including the active carbonyl group from water solution comprising subjecting the water to the action of hydrazinated chlorinated coal.

5. A process for removing organic acids and all compounds containing the active carbonyl group from water solution comprising passing the water solution through a filter containing hydrazinated chlorinated coal.

6. A process for removing organic acids and all compounds containing the active carbonyl group from water solution comprising subjecting the water for a time period of approximately twenty minutes to the action of hydrazinated chlorinated coal.

OLIVER M. URBAIN.
WILLIAM R. STEMEN.